Patented Oct. 11, 1949

2,484,376

UNITED STATES PATENT OFFICE 2,484,376

CREAM STYLE CORN

Ralph Cover, Westminster, Md., assignor to The United Products Company, Westminster, Md., a corporation of Maryland No Drawing. Application January 20, 1947, Serial No. 723,207

8 Claims. (Cl. 99—186)

This invention relates to cream style corn and processes of preparing cream style corn.

An object of this invention is to produce cream style corn which is substantially free of corn silks, cob tissues and worms.

Another object of this invention is to reduce materially the amount of bacteria incident in the present methods in producing cream style corn.

Another object of this invention is to improve the quality, flavor and taste of cream style corn.

Another object of this invention is to provide efficient and economical processes for the preparation of cream style corn.

In the production of cream style corn, sometimes called Maine style corn, by a widely used commercial process, the husked ears of corn are usually run through corn washers to free the ears from corn silks and other foreign substances on the outside of the ears. After a visual inspection, the ears of corn may be run through a machine which brushes the ears and thereby removes additional corn silk mechanically with the aid of water, at the risk, however, of a serious bacteria build-up. The ears of corn are then cut and scraped to remove the corn kernels from the cob. In this operation, the pressures applied by the conveying mechanisms, such as spur wheels and by the cutting mechanism itself, and the high speed of the machines ordinarily employed for this purpose result in the presence in the resulting product of a considerable amount of cob tissues, such as those surrounding the base of the kernels. In addition, due to lack of proper control in the regulation of the depth of cut for the wide variety of the irregular sized and shaped ears of corn, a relatively large amount of cob tissues is cut, which is added to the mass of corn kernels to be canned. Then, too, worms, such as the European corn borer, that may be in the kernels of corn or in the cob tissues adjacent the kernel are cut with the kernels, and become part of the mass of corn product which is canned. Corn silks, which are not removed in the initial washing, are also cut up and made part of the final product. The cut corn, cob tissues, corn silk and worms are then passed through a series of vibrating or revolving screens, which remove some of the cob tissues and corn silks. The corn product resulting from the cutting and scraping after the cleaning is mixed and heated with the proper amount of water, salt, sugar and sometimes corn starch. The mixture is heated with live steam until it is partially set, after which it is conveyed to a tank maintained at an elevated temperature. It is then placed in cans and sealed.

Due to the bacteria build-up in the corn cutting and corn cleaning equipment, a relatively long period of sterilization is required, because if all bacteria are not killed after the sealing of the container, they continue to multiply in one form or another, resulting in spoiling of the product. The lid of the can may blow off due to the pressure created by the gases produced by these bacteria or the corn may become sour. There is also the danger that if *Clostridium botulinum* be present, food poisoning may result.

In addition to the bacterial build-up incident in the method of producing cream style corn, the presence of cob tissues, corn silks, worms and other substances may materially affect the taste, color and flavor of the cream style corn. Also, in the present day cream style corn, there are empty hulls scraped off, which unfavorably affect the eating qualities of the product. Cream style corn prepared from kernels that have been cut too deeply and contain an excess quantity of cob tissues, has a decidedly inferior taste and color. Then, too, the maturity of corn which is employed in the preparation of the cream style corn is a limiting factor because unless prepared from young, tender sweet corn of a maturity of the early cream stage, it cannot be a cream style corn of the so-called "fancy" grade (highest grade) in accordance with the standards set by the United States Department of Agriculture. (United States Department of Agriculture—United States Standards for Grades of Canned Corn—Cream Style, reissued November, 1945.) Also, because the toughness of the hull or pericarp of the corn grain depends to a marked extent on the relative moisture which the corn plant receives, the weather is a limiting factor in the production of cream style corn. In a dry season, for example, the hull becomes tough at an early stage of maturity, and such corn unless picked within a relatively short period would be unsuitable for the production of cream style corn of the so-called "fancy" grade. These limitations in the processing of cream style corn have contributed to the decline of the production of that commodity.

Although the relative maturity of corn within a narrow range is a material limitation in the production of a "fancy" product, the most serious objection to present day cream style corn is the presence of scrapings. It is practically impossible to scrape the kernels or parts thereof from a cob of corn without also removing the fine fuzzy tissue surrounding the kernel. The spring pressure required in the scraping operation is sufficiently high under some conditions, not only to remove the fuzzy cob tissues, but in addition, relatively large pieces of cob tissues. And the presence of these scrapings including the fuzzy cob tissues are highly objectionable from an appearance, flavor and taste standpoint.

In accordance with this invention, a new cream style corn may be produced which is substantially free of the scrapings contained in present day cream style corn, and more particularly, is substantially free of corn silks, cob tissues, worms and other foreign substances. This cream style corn may be produced from corn having a tough hull and considerably advanced in maturity. In fact, a cream style corn of this invention may be prepared from whole grains more advanced than the early cream stage and yet be superior to a cream style corn prepared from corn having a maturity of the milk to early cream stage by present day methods, and having a rating of "fancy" in accordance with present standards. Moreover, there is markedly less chance of bacteria build-up in the process by which the cream style corns of this invention are prepared than in the methods employed in production of cream style corn by present day methods.

The new cream style corn comprises two components; a kernel component and a finely divided component. The kernel component consists of corn grains divided into not more than three parts. Desirably, the size of the individual kernels of the kernel component is at least 30% of the whole kernel and the size is preferably from 40 to 90% of the whole kernel. The finely divided component is prepared from whole corn grains or parts thereof, and, desirably, these corn grains prior to reduction to a finely divided state, are not divided into more than three parts and each kernel is not smaller than 30% of the whole kernel. The corn grains employed for the kernel component, those used to produce the finely divided component, and the resulting cream style corn are substantially free of foreign substances, such as cob tissues, corn silks and worms.

The process of this invention avoids the scraping operation employed to produce present day cream style corn and includes the removal by water, after cutting, of foreign substances from the kernels employed as both components in the cream style corn. To prepare the new cream style corn, the ears of corn are first properly trimmed and the corn grains or parts thereof are cut from the cob by any suitable mechanism such as that disclosed in U. S. Patent 2,141,346 granted to applicant on December 27, 1938. If the kernel component comprises grains of corn cut into two or three parts, a cutting machine having multiple cutters may be employed whereby the grains of corn on the cob are cut substantially simultaneously, or in sequence into two or three parts. Preferably, although not necessarily, the cut corn grains are processed through a silker which removes large pieces of cob tissue, many silks, some husks and breaks up clusters of grains, which sometimes cling together, particularly if the cutting machine operates efficiently. The silker comprises a plurality of separated wires forming a tray into which the cut corn grains are placed. The corn silks cling to the wires of the silker, while the pieces of cob are retained on the wires through which the cut corn grains pass. From the silker the cut corn grains are preferably, although not necessarily, processed in a shaker-rinser. The shaker-rinser comprises a screen table divided into two screens through which the cut corn grains are incapable of passing, while the chits or hearts of the corn and other finely divided matter pass through the screen. This second part of the screen of the shaker-rinser has water running on it, while the first part of the screen may have water running on it although preferably it does not. From the shaker-rinser, or if neither a shaker-rinser or silker is employed, from the cutting machine, the cut corn grains are placed in a flotation washer, which is fundamentally a separator in which water is used to separate the cut corn grains from the cob tissues, corn silks and worms by flotation. Desirably, there is a surface current on the top of the water in the flotation washer, and the cut corn grains are dropped into this surface current. Cob tissues, worms and corn silks float away. In addition, immature corn too young for canning and pithy grains also float away, while the cut corn suitable for canning drops to the bottom of the flotation washer. The cut corn grains preferably, although not necessarily, are passed through another shaker-rinser having two screens, the first of which is maintained in a wet condition by the continual passage of water therethrough, while the second is in a dry condition. After passing through this shaker-rinser, the cut corn grains are ready for the preparation of the mixture of the new cream style corn. If the shaker-rinser is not employed, the corn grains are taken directly from the flotation washer. For the preparation of the finely divided component of the new cream style corn, the cut corn grains which are substantially free of foreign substances, such as cob tissues, corn silks and worms, are ground and chopped to a divided state sufficiently fine to pass through an 8 mesh sieve (aperture opening .097 in.) and preferably through a 10 mesh sieve (aperture opening .0787 in.). Alternately, the finely divided component may be prepared from whole kernels of corn, for example, which are washed after cutting in the flotation or other washer as described, and the kernels rolled by any suitable mechanism to remove the hull. The endosperm contained within the hull in the original corn grain is separated from the hull. The endosperm, with or without the chit, may then be chopped or cut to a divided state sufficiently fine to pass through an 8, and preferably, a 10 mesh sieve to produce a finely divided component containing substantially none of the hulls of the corn grains from which it is prepared. Whether the finely divided component is prepared from cut kernels of corn having the hulls thereon or from kernels without the hulls, it is mixed with the kernel component in the desired proportions and an aqueous solution of sugar and salt added to effect the desired consistency and flavor. The mixture is then placed in cans and sterilized.

If desired, the chit or embryo may be substantially eliminated from the cream style corn. By cutting the corn sufficiently shallow, only a negligible amount of the chit may remain in the cut corn, or the corn may be cut more deeply so that the chit in the cutting operation becomes loosened, but not freed from the cut corn. In either case, by passing the cut corn a sufficient number of times over the shaker-rinser, the cut corn may be freed substantially of the chit. It may then be processed through the flotation washer to free it of the foreign substances such as cob tissues, corn silks and worms. To prepare a cream style corn which is substantially free of chit, cut corn grains produced in the manner described and substantially free of chit as well as corn silks, cob tissues and worms are finely divided and mixed with the cut corn kernels forming the kernel component of the product and prepared in a similar manner and which are also substantially freed of chits, corn silks, cob tissues and worms.

The proportion by weight of the kernel component of the new cream style corn is 20 to 40%, preferably 20 to 25% by weight. During the processing of the cut kernels constituting the kernel component in the transfer of the cut kernels from one step to another, the hulls of a greater or less proportion of the cut kernels are detached from the endosperm and sometimes the chit contained within the hull of the kernel. In determining the amount of the kernel component in the cream style corn, these empty hulls are excluded and do not constitute part of the kernel component of the cream style corn. The amount of finely divided component comprises 35 to 55%, and preferably 40 to 50%, by weight of the cream style corn. The combined kernel component and the finely divided component do not exceed 75% by weight of the cream style product. Sufficient sugar and salt are added to obtain a concentration in the final product of .3 to .7% salt and 3 to 6% sugar, by weight. Desirably, the sugar and salt are added in an aqueous solution. The remainder of the cream style corn comprises chiefly water.

The kernel component may be the same or a different variety or maturity from the finely divided component. For example, whole kernels of corn of a maturity of the milk to the early cream stage may constitute the kernel component, while the finely divided component may be obtained by cutting and chopping corn grains of a maturity more advanced than the early cream stage. In this manner, corn having a maturity more advanced than the early cream stage may be utilized in the preparation of cream style corn. And because the corn heretofore employed for cream style corn ordinarily contributed both the cream portion and the kernel portion, such older corns were usually discarded as a source for making "fancy" cream style corn. In fact, the Department of Agriculture, as one of the factors in the grading of cream style canned corn, noted that, to receive the highest rating from a maturity standpoint, the kernels of corn should be in the early cream stage (United States Department of Agriculture—United States Standards for Grades of Canned Corn—Cream Style, reissued November, 1945). But, in the new cream style corn, the presence of finely divided older corn having a maturity more advanced than the early cream stage, when reduced to finely divided form to serve as a component, results in a product superior to that of the present day cream style corn, because of the greater amount of character to be found in the more mature corn. If whole kernels of younger corn, such as those having a maturity of the milk to early cream stage, are mixed with the finely divided older corn which is substantially free of foreign substances, or if the kernels of slightly more mature corn are divided into two or three parts, older corn which could not be employed even for the preparation of second or third grade products by present day methods can be used as the finely divided component of a first grade product when prepared in accordance with this invention. Moreover, because of the greater water absorbing qualities of the more mature stage corn, a higher yield in cans per ton of a "fancy" grade product is obtained by the practice of this method than that resulting in the production of standard grade products by the present day methods.

The depth of the grains of the kernel component of the new cream style corn and the division, if any, of the kernels into two or three parts, depends upon the variety of corn and its maturity. For example, whole kernels of Yellow Bantam or Golden Cross corn of a maturity of the early cream stage are satisfactory, while the kernels of certain varieties such as Country Gentleman or Evergreen in the cream stage of maturity have been divided into three parts. The size of each of the grains of the kernel component is not smaller than 30%, and preferably is 40 to 90% of the whole kernel, the relative proportion of the whole kernel used for the kernel component depending upon the size of the whole kernel and upon the maturity. If the maturity is more advanced, the relative percent of the whole kernel used is at the lower end of the range, while when the corn is young, the size is toward the upper limit of the range.

A specific example of the practice of this invention is as follows:

Kernels of corn having a maturity of the milk to early cream stage are cut from the cob by apparatus similar to that disclosed in applicant's U. S. Patent No. 2,141,346. The kernels are cut at a point almost tangent to the termination of the cob tissues adjacent the kernels so that the cut kernels contain about ¾ of the heart germ or embryo of the corn kernel. The average size of each grain cut is about 90% of the whole kernel. The cut kernels are then passed successively through the silker, shaker-rinser, flotation washer, and shaker-rinser as heretofore described. In the silker, much of the heart germ or chit is removed, while the passage through the flotation washer insures the substantial freedom of the corn kernels from corn silks, cob tissues and worms. Corn of a maturity of the dough stage is cut and freed of cob tissues, corn silks and worms in a similar manner. The corn grains of this older corn are ground sufficiently fine to be washed through an 8 mesh sieve with water. 54 lbs. of the finely divided older corn are mixed with 24 lbs. of the younger, substantially whole kernel corn. To this mixture is added 42 lbs. (about 5 gals.) of an aqueous solution containing 120 lbs. of cane sugar and 15 lbs. of salt per 100 gallons of water. The resulting mixture is preheated to a temperature of 180° F., then placed in cans and the cans sealed. The sealed cans are then heated for a period of about 65 minutes at 250° F.

The resulting cream style corn is substantially free from cob tissues, silks, worms and contains substantially no empty hulls. When a can of this product is passed with the aid of wash water successively through 8, 20 and 40 mesh sieves, only the kernel component with a few empty hulls remains on the 8 mesh sieve, the finely divided component passing substantially completely through this sieve, while the bulk of the water insoluble solids of the finely divided component is retained on the 20 mesh sieve. The 40 mesh sieve retains only a very small amount, about a tablespoon to the can of fine particles.

A typical sample of present day cream style corn subjected to the same testing under identical conditions reveals objectionable amounts of cob tissues, empty hulls and other foreign substances retained on the 8 mesh sieve, fuzzy cob tissues on the 20 mesh sieve, and apparently added corn starch on the 40 mesh sieve.

While in the preferred embodiment, the kernels of corn can be cut by apparatus similar to that disclosed in applicant's U. S. Patent 2,141,346, other cutting apparatus may be employed. For example, the rotating head type cutter may be employed. The advantage of employing the type of apparatus disclosed in applicant's patent is that the cutting of the kernels is uniform, regardless of the irregularity of the shape of the ears, and as a result a lesser quantity of cob tissues are mixed with the cut corn. However, by the employment of cutting mechanisms such as the so-called rotating head cutter, the cob tissues can be removed in the flotation washer, and the resulting corn kernels will be substantially freed from cob tissues, corn silks and worms.

Instead of the flotation washer, other means may be used to separate the cob tissues, corn silks, worms and other foreign substances from the cut corn kernels or parts thereof. Desirably, the separation is effected by utilizing the difference in specific gravity between the cut corn grains and the foreign substances such as cob tissues, corn silks and worms. Water through which a steady but gentle current passes has been found especially satisfactory for this purpose, because the cut corn kernels may be dropped into this stream, the cut corn kernels sinking to the bottom, while the cob tissues, corn silks, worms and other foreign substances float along with the stream. However, shallowly cut grains of corn may be effectively, although not quite as efficiently, substantially freed of foreign substances such as cob tissues, corn silks and worms by passing the cut kernels over vibrating or rotating screens through which the cut corn grains are incapable of passing. In those vibrating and rotating screens, water sprays completely wash and rinse thoroughly the corn kernels as they pass thereover, while the foreign matter passes through the screen.

While preferred embodiments of this invention have been described, various modifications may be made therein without departing from the scope of the appended claims.

What is claimed is:

1. The process of preparing a cream style corn product comprising removing corn silks, cob tissues and worms by water from kernels of corn selected from the class consisting of whole kernels and parts of whole kernels of corn after removal from the cob, reducing said kernels to a finely divided state and mixing in the substantial absence of corn scrapings the resulting product with kernels of corn which are substantially free of corn silks, cob tissues and worms and which are selected from the class consisting of whole kernels and parts of whole kernels of corn, in such proportions that the final cream style corn contains 20 to 40% of the unreduced kernels and 35 to 55% of the finely divided product.

2. In the process of preparing a cream style corn product which contains 20 to 40% of kernels of corn and 35 to 55% of finely divided corn grains, the step which comprises washing after severance from the cob said kernels and the corn kernels from which said finely divided corn grains are produced to remove substantially completely corn silks, cob tissues, worms and other foreign substances therefrom.

3. The process of preparing a cream style corn product comprising mixing in the substantial absence of corn scrapings kernels of corn which are substantially free of corn silks, cob tissues and worms and which are selected from the class consisting of whole kernels and parts of whole kernels of corn with finely divided corn grains which are substantially free of corn silks, cob tissues and worms, in such proportions that the quantity of said corn kernels in said product is 20 to 40% and the quantity of said finely divided corn grains is 35 to 55%.

4. In the process of preparing a cream style corn product containing 20 to 40% of a kernel component consisting of kernels of corn which are substantially free of corn silks, cob tissues and worms and which are selected from the class consisting of whole kernels and parts of whole kernels of corn and 35 to 55% of a finely divided corn component of corn grains, the steps which comprise washing corn kernels after removal from the cob with water to remove cob tissues, corn silks and worms therefrom, dividing said corn kernels sufficiently fine so that substantially all of the resulting product is capable of passing through an 8-mesh sieve and mixing in the substantial absence of corn scrapings the resulting product with kernels of corn which are substantially free of corn silks, cob tissues and worms and which are selected from the class consisting of whole kernels and parts of whole kernels of corn.

5. The process of preparing a cream style corn product comprising water washing kernels of corn after severance from the cob to remove cob tissues, corn silks and worms therefrom, comminuting said water washed kernels sufficiently fine so that substantially all of the resulting product is capable of passing through an 8 mesh sieve, mixing in the substantial absence of any corn scrapings the resulting comminuted product with a kernel component substantially free of corn silks, cob tissues and worms, and substantially all of which are of a size of at least 30% of the whole kernel, in such proportions that the final cream style corn product contains 20 to 40% of said kernel component and 35 to 55% of said comminuted product.

6. The process of preparing a cream style corn product comprising mixing in the substantial absence of corn scrapings unbalanced and uncooked kernels of corn which are substantially free of corn silks, cob tissues and worms and which are selected from the class consisting of whole kernels and parts of whole kernels of corn with finely divided corn grains which are substantially free of corn silks, cob tissues and worms, in such proportions that the final cream style corn product contains 20 to 40% of said kernels of corn and 35 to 55% of said finely divided product and sterilizing the resulting mixture.

7. The process of preparing a cream style corn product comprising water washing kernels of corn after severance from the cob to remove substantially completely corn silks, cob tissues and worms therefrom, comminuting said water washed kernels sufficiently fine so that substantially all of the resulting product is capable of passing through an 8-mesh sieve and mixing in the substantial absence of corn scrapings the resulting product with kernels of corn, which are of a less advanced average stage of maturity than that of the kernels from which said resulting product is produced and which are water washed after severance from the cob to remove substantially completely corn silks, cob tissues and worms, in such proportions that the final cream style corn product contains 20 to 40% of the unreduced kernels and 35 to 55% of the finely divided product.

8. The process of preparing a cream style corn product which contains 20 to 40% of kernels of corn and 35 to 55% of a finely divided corn grain component, said method comprising water washing after severance from the cob said kernels of corn and the grains of corn from which said finely divided component is produced to remove substantially completely corn silks, cob tissues and worms therefrom, comminuting the washed grains of corn for the finely divided corn component which are of a more advanced average stage of maturity than that of said kernels of corn and mixing in the substantial absence of corn scrapings the resulting finely divided corn grains with said kernels of corn.

RALPH COVER.

REFERENCES CITED

The following references are of record in the file of this patent:

UNITED STATES PATENTS

| Number | Name | Date |
| --- | --- | --- |
| 139,595 | McMurray | June 3, 1873 |
| 1,742,240 | Donthitt | Jan. 7, 1930 |
| 2,000,892 | Lewis | May 7, 1935 |

Certificate of Correction

October 11, 1949

Patent No. 2,484,376

RALPH COVER

It is hereby certified that errors appear in the printed specification of the above numbered patent requiring correction as follows:

Column 8, line 15, for "sliks" read *silks*; line 50, for the word "unbalanced" read *unblanched*; column 10, line 14, list of references cited, for "Donthitt" read *Douthitt*;

and that the said Letters Patent should be read with these corrections therein that the same may conform to the record of the case in the Patent Office.

Signed and sealed this 21st day of February, A. D. 1950.

[SEAL]

THOMAS F. MURPHY,
*Assistant Commissioner of Patents.*